United States Patent
Cordova et al.

(10) Patent No.: US 11,072,339 B2
(45) Date of Patent: Jul. 27, 2021

(54) SYSTEMS AND METHODS FOR SCORING DRIVING TRIPS

(71) Applicant: TRUEMOTION, INC., Boston, MA (US)

(72) Inventors: Brad Cordova, Cambridge, MA (US); Rafi Finegold, Sharon, MA (US); Dan Shiebler, Boston, MA (US); Sam Cecala, Brookline, MA (US)

(73) Assignee: TRUEMOTION, INC., Boston, MA (US)

( * ) Notice: Subject to any disclaimer, the term of this patent is extended or adjusted under 35 U.S.C. 154(b) by 214 days.

(21) Appl. No.: 15/615,579

(22) Filed: Jun. 6, 2017

(65) Prior Publication Data

US 2017/0349182 A1   Dec. 7, 2017

Related U.S. Application Data

(60) Provisional application No. 62/346,013, filed on Jun. 6, 2016.

(51) Int. Cl.
| | |
|---|---|
| *B60W 40/09* | (2012.01) |
| *H04W 4/02* | (2018.01) |
| *G09B 19/16* | (2006.01) |
| *G07C 5/00* | (2006.01) |
| *G07C 5/08* | (2006.01) |

(52) U.S. Cl.
CPC ........... *B60W 40/09* (2013.01); *G07C 5/0858* (2013.01); *G09B 19/167* (2013.01); *H04W 4/027* (2013.01); *G07C 5/008* (2013.01)

(58) Field of Classification Search
CPC ...... B60W 40/09; G09B 19/167; G07C 5/008
See application file for complete search history.

(56) References Cited

U.S. PATENT DOCUMENTS

| | | | |
|---|---|---|---|
| 7,209,886 B2 | 4/2007 | Kimmel et al. |
| 8,117,049 B2 | 2/2012 | Berkobin et al. |
| 8,140,358 B1 | 3/2012 | Ling et al. |
| 8,165,916 B2 | 4/2012 | Hoffberg et al. |
| 8,284,039 B2 | 10/2012 | Baker et al. |

(Continued)

FOREIGN PATENT DOCUMENTS

| | | |
|---|---|---|
| EP | 3091498 A1 | 11/2016 |
| WO | 2012097441 A1 | 7/2012 |

(Continued)

OTHER PUBLICATIONS

U.S. Appl. No. 14/139,510, "Non-Final Office Action", dated Jul. 9, 2015, 13 pages.

(Continued)

*Primary Examiner* — Jerry-Daryl Fletcher
*Assistant Examiner* — Sadaruz Zaman
(74) *Attorney, Agent, or Firm* — Kilpatrick Townsend & Stockton LLP

(57) ABSTRACT

Embodiments of the present invention utilize mobile devices to provide information on a user's behaviors during transportation. For example, a mobile device carried by a user can be used to detect and analyze driving behaviors during trips in vehicles. The mobile device can further be used to assign and display scores relating to the driving behaviors, scores for individual trips, and an overall driving score for the particular user.

23 Claims, 10 Drawing Sheets

(56) References Cited

U.S. PATENT DOCUMENTS

| | | | |
|---|---|---|---|
| 8,285,439 B2 | 10/2012 | Hodges et al. | |
| 8,296,007 B2 | 10/2012 | Swaminathan et al. | |
| 8,311,858 B2 | 11/2012 | Everett et al. | |
| 8,527,013 B2 | 9/2013 | Guba et al. | |
| 8,595,034 B2 | 11/2013 | Bauer et al. | |
| 8,862,486 B2 | 10/2014 | Cordova et al. | |
| 9,055,407 B1 | 6/2015 | Howard et al. | |
| 9,056,616 B1* | 6/2015 | Fields | B60W 50/14 |
| 9,141,995 B1 | 9/2015 | Brinkmann et al. | |
| 9,892,573 B1* | 2/2018 | Hsu-Hoffman | G07C 5/008 |
| 2004/0236474 A1* | 11/2004 | Chowdhary | G08G 1/20 |
| | | | 701/1 |
| 2004/0236596 A1 | 11/2004 | Chowdhary et al. | |
| 2004/0252027 A1 | 12/2004 | Torkkola et al. | |
| 2007/0136107 A1 | 6/2007 | Maguire et al. | |
| 2008/0065427 A1 | 3/2008 | Helitzer et al. | |
| 2008/0154629 A1 | 6/2008 | Breed et al. | |
| 2009/0043449 A1 | 2/2009 | Matsuura et al. | |
| 2009/0197619 A1 | 8/2009 | Colligan et al. | |
| 2009/0216704 A1 | 8/2009 | Zheng et al. | |
| 2010/0131304 A1* | 5/2010 | Collopy | G06Q 30/0224 |
| | | | 705/4 |
| 2010/0174576 A1* | 7/2010 | Naylor | G06Q 10/04 |
| | | | 701/31.4 |
| 2010/0205012 A1 | 8/2010 | McClellan et al. | |
| 2010/0292921 A1 | 11/2010 | Zachariah et al. | |
| 2011/0012759 A1 | 1/2011 | Yin | |
| 2011/0125394 A1 | 5/2011 | Horstemeyer | |
| 2011/0153367 A1 | 6/2011 | Amigo et al. | |
| 2011/0251752 A1* | 10/2011 | DeLarocheliere | G08G 1/20 |
| | | | 701/31.4 |
| 2011/0275321 A1 | 11/2011 | Zhou et al. | |
| 2011/0294520 A1 | 12/2011 | Zhou et al. | |
| 2012/0028624 A1 | 2/2012 | Jedlicka | |
| 2012/0066251 A1 | 3/2012 | Gontmakher et al. | |
| 2012/0071151 A1* | 3/2012 | Abramson | H04W 12/0802 |
| | | | 455/418 |
| 2012/0072244 A1 | 3/2012 | Collins et al. | |
| 2012/0150651 A1 | 6/2012 | Hoffberg et al. | |
| 2012/0197669 A1 | 8/2012 | Kote et al. | |
| 2012/0209634 A1 | 8/2012 | Ling et al. | |
| 2012/0214463 A1 | 8/2012 | Smith et al. | |
| 2012/0237908 A1* | 9/2012 | Fitzgerald | G06F 21/88 |
| | | | 434/236 |
| 2012/0296885 A1 | 11/2012 | Gontmakher et al. | |
| 2012/0303392 A1 | 11/2012 | Depura et al. | |
| 2012/0310587 A1 | 12/2012 | Tu et al. | |
| 2012/0316913 A1 | 12/2012 | Reyes | |
| 2013/0006674 A1 | 1/2013 | Bowne et al. | |
| 2013/0046562 A1 | 2/2013 | Taylor et al. | |
| 2013/0091948 A1* | 4/2013 | Yamamoto | G01C 19/5733 |
| | | | 73/504.02 |
| 2013/0173128 A1* | 7/2013 | Syed | B60L 50/50 |
| | | | 701/70 |
| 2013/0184928 A1* | 7/2013 | Kerkhof | G09B 19/167 |
| | | | 701/29.1 |
| 2013/0209968 A1* | 8/2013 | Miller | G09B 9/052 |
| | | | 434/65 |
| 2013/0238241 A1 | 9/2013 | Chelotti et al. | |
| 2013/0244210 A1* | 9/2013 | Nath | G07C 5/008 |
| | | | 434/65 |
| 2014/0108058 A1 | 4/2014 | Bourne et al. | |
| 2014/0114889 A1* | 4/2014 | Dagum | G06F 19/3418 |
| | | | 706/12 |
| 2014/0149145 A1 | 5/2014 | Peng et al. | |
| 2014/0162219 A1* | 6/2014 | Stankoulov | B60W 50/14 |
| | | | 434/65 |
| 2014/0180730 A1 | 6/2014 | Cordova et al. | |
| 2014/0180731 A1 | 6/2014 | Cordova et al. | |
| 2014/0193781 A1* | 7/2014 | Sands | G09B 19/167 |
| | | | 434/64 |
| 2014/0222253 A1 | 8/2014 | Siegel et al. | |
| 2014/0272810 A1* | 9/2014 | Fields | G09B 9/052 |
| | | | 434/65 |
| 2014/0272894 A1* | 9/2014 | Grimes | G09B 5/08 |
| | | | 434/350 |
| 2014/0324745 A1 | 10/2014 | Leppänen et al. | |
| 2014/0370919 A1 | 12/2014 | Cordova et al. | |
| 2015/0025917 A1* | 1/2015 | Stempora | G06K 9/0061 |
| | | | 705/4 |
| 2015/0170030 A1 | 6/2015 | Maennel | |
| 2015/0186714 A1 | 7/2015 | Ren et al. | |
| 2015/0296334 A1 | 10/2015 | Smyrk et al. | |
| 2016/0046298 A1 | 2/2016 | Deruyck et al. | |
| 2016/0051167 A1 | 2/2016 | Saha et al. | |
| 2016/0066155 A1 | 3/2016 | Fan et al. | |
| 2016/0127486 A1 | 5/2016 | Chen et al. | |
| 2016/0163217 A1* | 6/2016 | Harkness | G09B 5/06 |
| | | | 434/65 |
| 2016/0327397 A1 | 11/2016 | Cordova et al. | |
| 2016/0379141 A1 | 12/2016 | Judge et al. | |
| 2017/0039890 A1* | 2/2017 | Truong | G07C 5/08 |
| 2017/0105098 A1 | 4/2017 | Cordova et al. | |
| 2017/0142556 A1 | 5/2017 | Matus | |
| 2017/0200061 A1* | 7/2017 | Julian | G06K 9/00791 |
| 2017/0210290 A1 | 7/2017 | Cordova et al. | |
| 2017/0349182 A1* | 12/2017 | Cordova | B60W 40/09 |
| 2019/0018416 A1* | 1/2019 | Gassend | G05D 1/0231 |
| 2019/0102840 A1* | 4/2019 | Perl | B60W 40/09 |

FOREIGN PATENT DOCUMENTS

| | | |
|---|---|---|
| WO | 2014105846 A2 | 7/2014 |
| WO | 2014105846 A3 | 10/2014 |

OTHER PUBLICATIONS

U.S. Appl. No. 14/139,510, "Notice of Allowance", dated Mar. 28, 2016, 10 pages.
U.S. Appl. No. 14/192,452, "Non Final Office Action", dated Apr. 25, 2014, 10 pages.
U.S. Appl. No. 14/192,452, "Notice of Allowance", dated Jun. 10, 2014, 13 pages.
PCT/US2013/077544, "International Search Report and Written Opinion", dated Aug. 5, 2014, 11 pages.
PCT/US2016/052210, "International Search Report and Written Opinion", dated Nov. 29, 2016, 9 pages.
U.S. Appl. No. 15/413,005, "Final Office Action", dated Feb. 1, 2018, 16 pages.
U.S. Appl. No. 15/413,005, "Non-Final Office Action", dated Jun. 16, 2017, 16 pages.
Beljecki, et al., "Transportation mode-based segmentation and classification of movement trajectories", International Journal of Geographical Information Science, vol. 27, Issue 2, Oct. 19, 2012, pp. 1-28.
Stenneth, et al., "Transportation Mode Detection using Mobile Phones and GIS Information", ACM SIGSPATIAL GIS, Nov. 1, 2011, pp. 54-63.
U.S. Appl. No. 15/413,005, "Final Office Action", dated May 30, 2019, 22 pages.
U.S. Appl. No. 15/413,005, "Non-Final Office Action", dated Sep. 13, 2019, 24 pages.
U.S. Appl. No. 15/413,005, "Final Office Action", dated Jan. 30, 2020, 24 pages.

* cited by examiner

700

Obtain measurements indicating that the mobile device is moving relative to the vehicle
710

720
Are some measurements indicative of driver inattentiveness? — No →

↓ Yes

730
Estimate activity

750
*Identify Aggravating/ Mitigating Factors*

760
Estimate the Level of Distraction and Determine Inattentive Event Score

FIG. 7

SYSTEMS AND METHODS FOR SCORING DRIVING TRIPS

CROSS-REFERENCES TO RELATED APPLICATIONS

This application claims the benefit of U.S. Provisional Patent Application No. 62/346,013, entitled "SYSTEMS AND METHODS FOR SCORING DRIVING TRIPS", filed Jun. 6, 2016, the contents of which are hereby incorporated by reference in their entirety.

BACKGROUND OF THE INVENTION

Mobile devices, including smart phones, have been utilized to provide location information to users. Mobile devices can use a number of different techniques to produce location data. One example is the use of Global Positioning System (GPS) chipsets, which are now widely available, to produce location information for a mobile device. Some systems have been developed to track driving behaviors including speed, braking, and turn speed. Such systems include external devices that have been physically integrated with vehicles to track driving behavior.

SUMMARY OF THE INVENTION

Despite the progress made in relation to collecting data related to drivers and their driving behavior using mobile devices, there is a need in the art for improved methods and systems related to sensor-based tracking and modifying driving behavior using a mobile device.

Embodiments of the present invention relate to transportation systems. More particularly, embodiments relate to systems and methods for scoring driving trips based on sensor measurements from a mobile device.

Embodiments of the present invention utilize mobile devices to provide information on a user's behaviors during transportation. For example, a mobile device carried by a user can be used to detect and analyze driving behavior. The mobile device can further be used to provide a driving score based on the driving behavior, which may encourage modification of future driving behavior.

By monitoring a driver's behavior, determining good versus risky driving behaviors, and presenting results as part of a graphical user experience, some embodiments provide data that can be used to influence driver behavior. As a result, safer driving behavior can be achieved. Some embodiments improve on previous systems by not only collecting information on driver behavior, but influencing the driver's behavior to achieve safer driving. Behavior modification provides a broad category in which a number of behaviors can be modified using a variety of techniques and actions.

Thus, some embodiments allow interested parties, such as drivers, to identify and distinguish good and risky driving behaviors. Some embodiments further help drivers understand and improve their driving behavior. As a result, drivers may avoid unnecessary incidents, accidents, and even death. Financially, small impacts improving driving behavior (e.g., less distracted driving, less hard braking events, etc.) across a large population of drivers can have a major impact on society, with potential savings on the order of billions of dollars.

According to some embodiments, a method is provided. The method comprises obtaining sensor measurements at a measurement rate from one or more sensors of a mobile device in a vehicle during a trip, and identifying a user of the mobile device in the vehicle as a driver of the vehicle during the trip. The method further comprises monitoring a plurality of behaviors associated with the mobile device during the trip in the vehicle using the sensor measurements. The plurality of behaviors comprise at least one or all of a braking behavior, an acceleration behavior, a mobile device usage behavior, or a speeding behavior. In an embodiment in which all of these behaviors are used, the method further comprises computing a braking score using the braking behavior, computing an acceleration score using the acceleration behavior, computing a mobile device usage score using the mobile device usage behavior, and computing a speeding score using the speeding behavior. The method further comprises aggregating the braking score, the acceleration score, the mobile device usage score, and the speeding score to determine a trip score for the trip in the vehicle. The method further comprises updating the measurement rate for the sensor measurements from the one or more sensors of the mobile device for a subsequent trip in the vehicle based on the trip score. As described further herein, at least one or all of these behaviors may be used to determine the trip score.

According to some embodiments, a system is provided. The system comprises a mobile device comprising a plurality of sensors, a memory, and a processor coupled to the memory, wherein the processor is configured to perform operations including those recited in the methods described herein.

According to some embodiments, a computer-program product is provided. The computer-program product is tangibly embodied in a non-transitory machine-readable storage medium of a device. The computer-program product includes instructions that, when executed by one or more processors, cause the one or more processors to perform operations including the steps of the methods described herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 7 is a flowchart illustrating a method of determining mobile device usage according to some embodiments.

DETAILED DESCRIPTION OF SPECIFIC EMBODIMENTS

Figure 1:
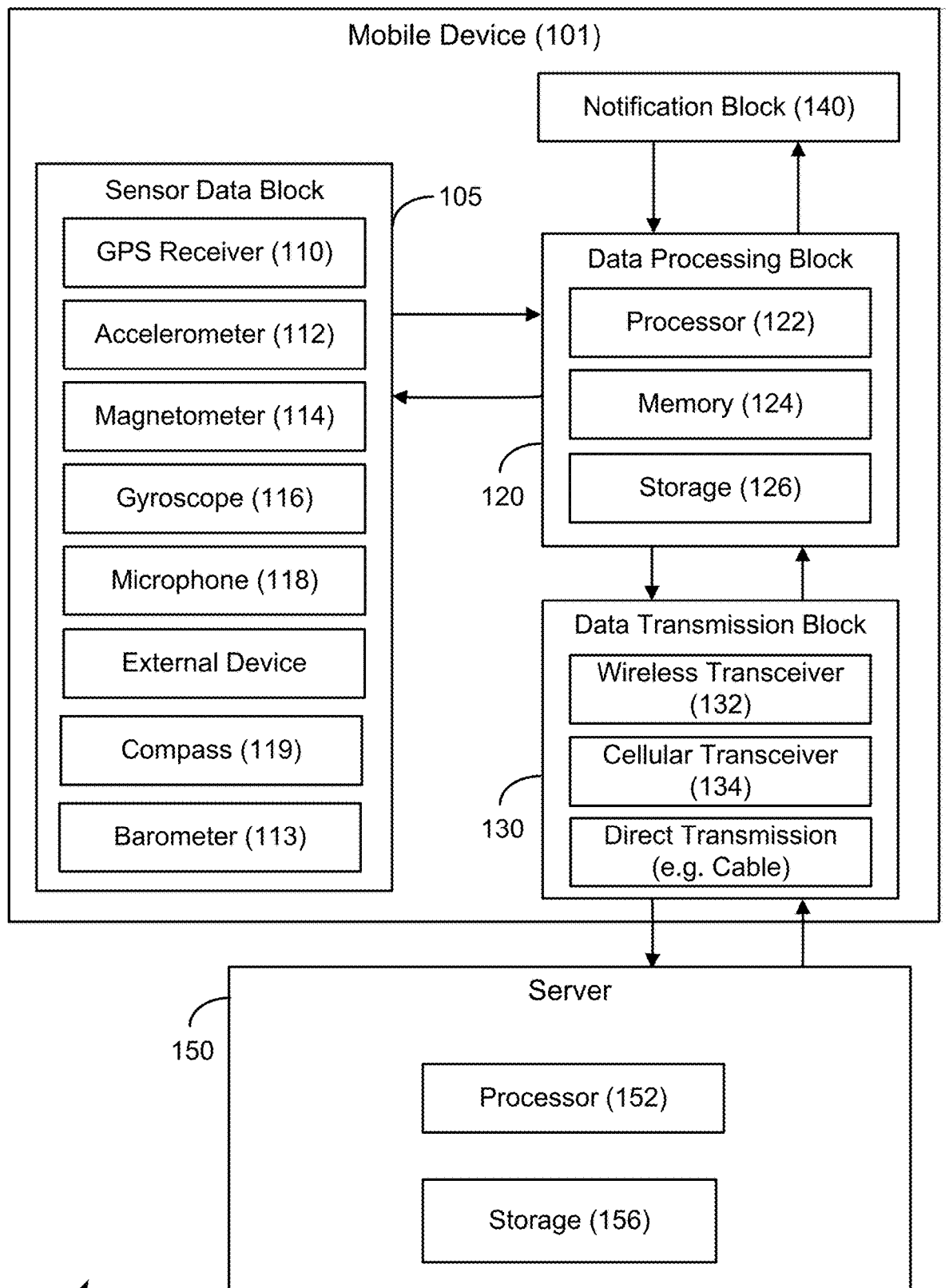
FIG. 1 is a system diagram illustrating a driving behavior detection and scoring system including a mobile device according to some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

FIG. 1 is a system diagram illustrating a system 100 for detecting and scoring driving data according to some embodiments. System 100 includes a mobile device 101 having a number of different components. Mobile device 101 may include a sensor data block 105, a data processing block 120, a data transmission block 130, and optionally a notification block 140. The sensor data block 105 includes data collection sensors as well as data collected from these sensors that are available to mobile device 101. This can include external devices connected via Bluetooth, USB cable, etc. The data processing block 120 includes storage 126, and manipulations done to the data obtained from the sensor data block 105 by processor 122. This may include, but is not limited to, analyzing, characterizing, subsampling, filtering, reformatting, etc. Data transmission block 130 may include any transmission of the data off the mobile device 101 to an external computing device that can also store and manipulate the data obtained from sensor data block 105. The external computing device can be, for example, a server 150. Server 150 can comprise its own processor 152 and storage 156. Notification block 140 may report the results of analysis of sensor data performed by the data processing block 120 to a user of the mobile device 101 via a display (not shown). For example, notification block 140 may display or otherwise report a score for a trip or for a plurality of trips to a user of the mobile device 101. In one embodiment, mobile device 101 may further include a scoring block (not shown) to score individual or collective trips, as described further herein with respect to FIG. 3. In other embodiments, the scoring may be performed by server 150, as described further herein with respect to FIG. 2.

Some embodiments are described using examples where driving data is collected using mobile devices 101, and these examples are not limited to any particular mobile device. As examples, a variety of mobile devices including sensors such as accelerometers 112, gyroscopes 116, compasses 119, barometers 113, location determination systems such as global positioning system (GPS) receivers 110, communications capabilities, and the like are included within the scope of the invention. Exemplary mobile devices include smart watches, fitness monitors, Bluetooth headsets, tablets, laptop computers, smart phones, music players, movement analysis devices, and other suitable devices. One of ordinary skill in the art, given the description herein, would recognize many variations, modifications, and alternatives for the implementation of embodiments.

To collect data associated with the driving behavior of a driver, one or more sensors on mobile device 101 (e.g., the sensors of sensor data block 105) are operated close in time to a period when mobile device 101 is with the driver when operating a vehicle—also termed herein "a drive" or "a trip". With many mobile devices 101, the sensors used to collect data are components of the mobile device 101, and use power resources available to mobile device 101 components, e.g., mobile device battery power and/or a data source external to mobile device 101.

Some embodiments use settings of a mobile device to enable different functions described herein. For example, in Apple iOS, and/or Android OS, having certain settings enabled can enable certain functions of embodiments. For some embodiments, having location services enabled allows the collection of location information from the mobile device (e.g., collected by global positioning system (GPS) sensors, and enabling background app refresh allows some embodiments to execute in the background, collecting and analyzing driving data even when the application is not executing. In some implementations, alerts are provided or surfaced using notification block 140 while the app is running in the background since the trip capture can be performed in the background. These alerts may facilitate driving behavior modification. Further disclosure regarding scoring and behavior modification may be found in U.S. patent application Ser. No. 15/413,005, filed Jan. 23, 2017, herein incorporated by reference in its entirety.

Figure 2:
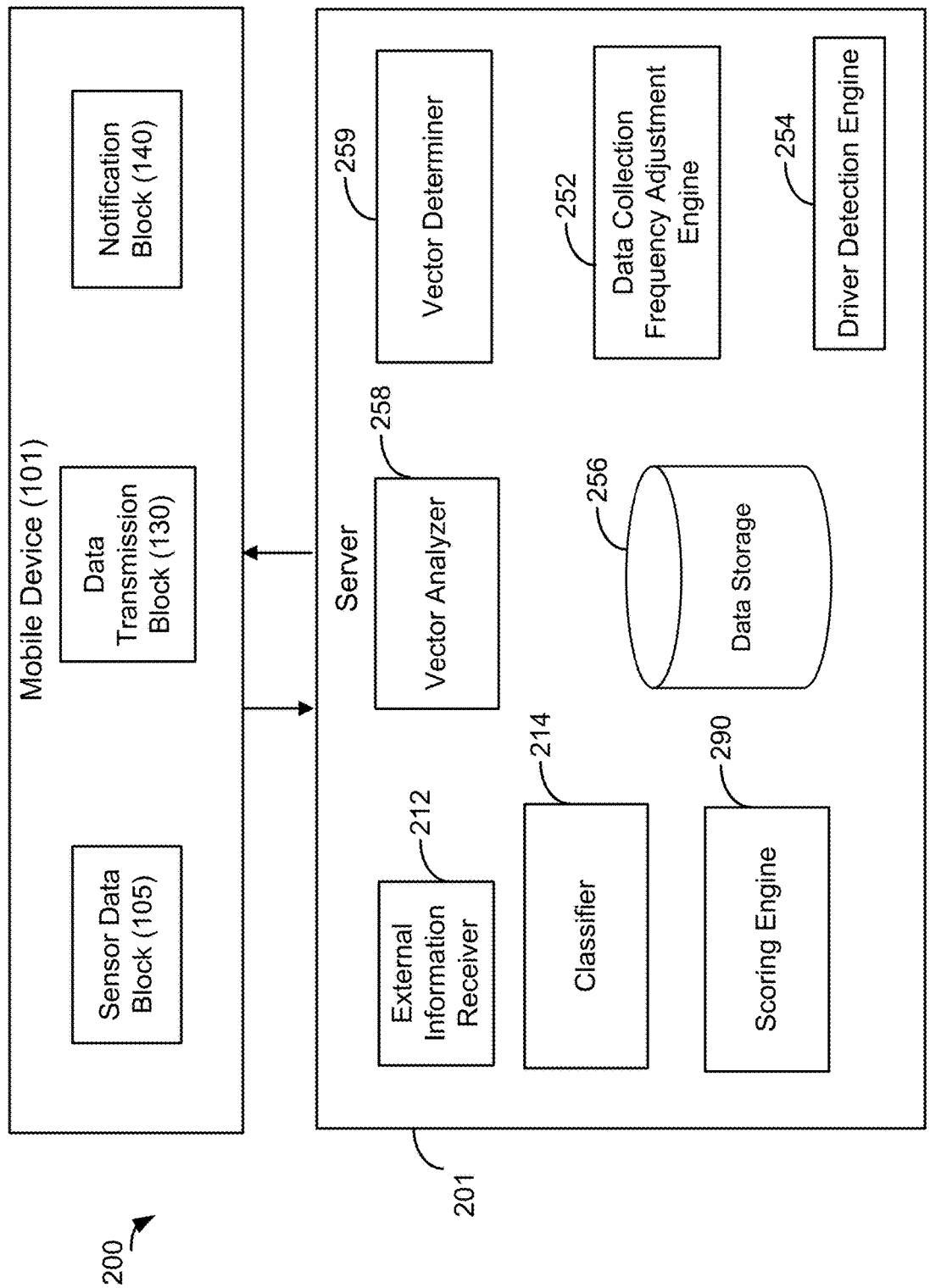
FIG. 2 is a system diagram illustrating a driving behavior detection and scoring system including a server according to some embodiments.

FIG. 2 shows a system 200 for collecting driving data that can include a server 201 that communicates with mobile device 101. Server 201 may be the same or a different server than server 150 of FIG. 1. In some embodiments, server 201 may provide functionality using components including, but not limited to vector analyzer 258, vector determiner 259, external information receiver 212, classifier 214, data collection frequency adjustment engine 252, driver detection engine 254, and scoring engine 290. These components may be executed by processors (not shown) in conjunction with memory (not shown). Server 201 may also include data storage 256. It is important to note that, while not shown, one or more of the components shown operating within server 201 can operate fully or partially within mobile device 101, and vice versa.

To collect data associated with the driving behavior of a driver, one or more sensors on mobile device 101 (e.g., the sensors of sensor data block 105) may be operated close in time to a period when mobile device 101 is with the driver when operating a vehicle—also termed herein "a drive" or "a trip". Once the mobile device sensors have collected data (and/or in real time), some embodiments analyze the data to determine acceleration vectors for the vehicle, as well as different features of the drive. For example, driver detection engine 254 may apply one or more processes to the data to determine whether the user of the mobile device 101 is a driver of the vehicle. Other examples are processes to detect and classify driving features using classifier 214, and determine acceleration vectors using vector analyzer 258 and vector determiner 259. In some embodiments, external data (e.g., weather) can be retrieved and correlated with collected driving data.

As discussed herein, some embodiments can transform collected sensor data (e.g., driving data collected using sensor data block 105) into different results, including, but not limited to, analysis of braking behavior, analysis of acceleration behavior, estimates of the occurrence of times where a driver is speeding ("speeding behavior"), and estimates of the occurrence of times where a driver was distracted ("mobile device usage behavior"). Examples of collecting driving data using sensors of a mobile device are described herein. Examples of analyzing collected driving data to detect driving behaviors are also described herein. Although some embodiments are discussed in terms of certain behaviors, the present invention is not limited to these particular behaviors and other driving behaviors are included within the scope of the present invention. The driving behaviors may be used by scoring engine 290 to assign a driving score to a trip or to a plurality of trips based on driving behaviors. Notifications of driving behavior, such as display of a driving score, can be made via notification block 140 of mobile device 101. The driving score may be used to adjust the frequency of data collected by sensor data block 105 in some embodiments, as adjusted by data collection frequency adjustment engine 252. Data collection frequency adjustment engine 252 may be in communication with mobile device 101 to cause the sensor data block 105 to collect data more frequently, less frequently, or at the same frequency, as described further herein with respect to FIG. 3.

Although shown and described as being contained within server 201, which can be remote from mobile device 101, it is contemplated that any or all of the components of server 201 may instead be implemented within mobile device 101, and vice versa. It is further contemplated that any or all of the functionalities described herein may be performed during a drive, in real time, or after a drive.

Figure 3:
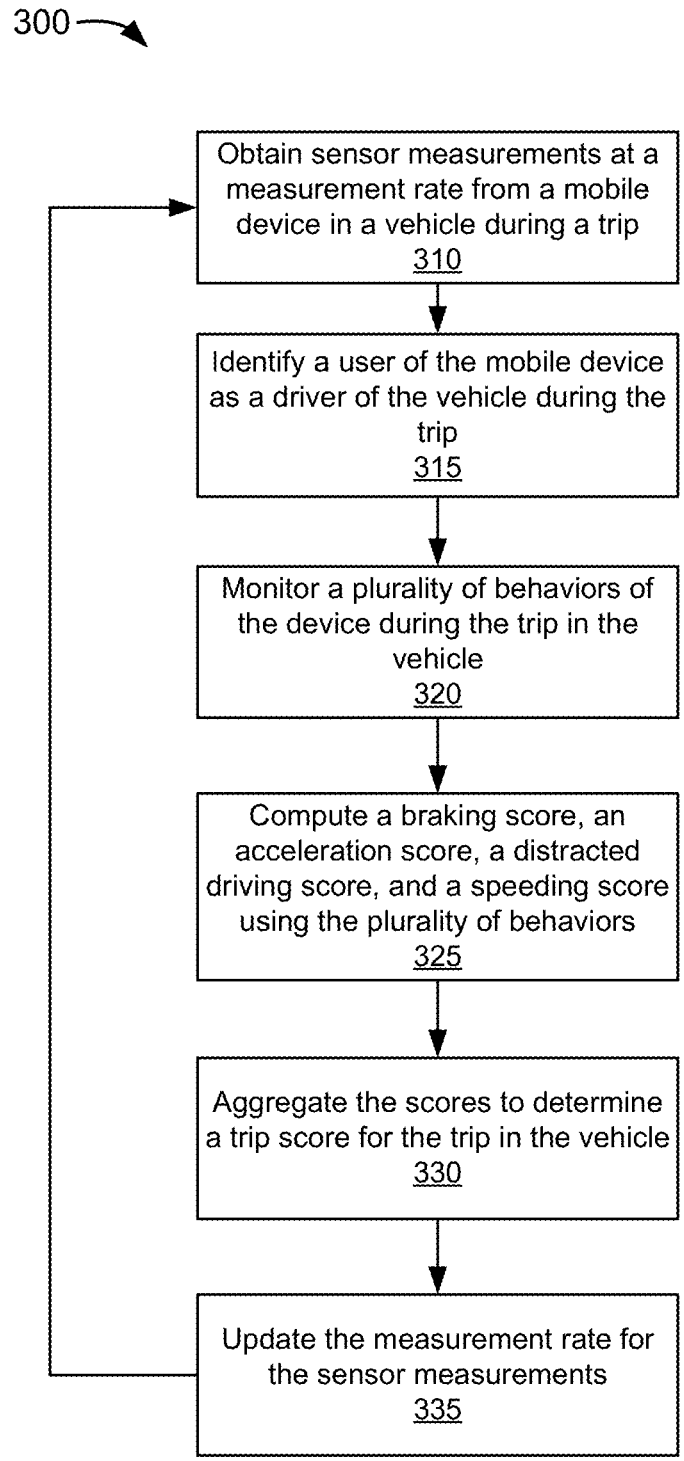
FIG. 3 is a flowchart illustrating a driving behavior detection and scoring method according to some embodiments.

FIG. 3 is a flowchart 300 illustrating a driving behavior detection and scoring method according to some embodiments. The method includes obtaining sensor measurements at a measurement rate from one or more sensors of a mobile device in a vehicle during a trip (310). The mobile device may be, for example, mobile device 101 of FIGS. 1 and/or 2. The sensor measurements may be driving data, such as that collected by one or more sensors within sensor data block 105 of FIG. 1. In some embodiments, the measurement rate may initially be set at any value, and may be adjusted based on the trip score, as described further herein. In some embodiments, an initial subset of data may be collected or an initial subset of sensors may be used for a first trip, and a different or overlapping subset of data may be collected or a different or overlapping subset of sensors may be used for a second trip, as described further herein.

A trip in a vehicle may be determined by any of a number of methods. For example, the start and end times of a trip may be determined according to the method described herein with respect to FIG. 4. Sensor measurements may be taken only between the start and end times of the trip in some embodiments, in order to prolong battery life of the mobile device and to avoid collection of unnecessary or unusable data. A trip in a vehicle (e.g., a car) as opposed to another form of transportation may be determined according to the method described herein with respect to FIG. 5, for example. Sensor measurements may be taken only when the trip is determined to be in a vehicle in one embodiment, also in order to prolong battery life of the mobile device and to avoid collection of unnecessary or unusable data. In some embodiments, the user of the mobile device may explicitly report that s/he is taking a trip, and/or that s/he is taking a trip in a vehicle.

The method further includes identifying a user of the mobile device as a driver of the vehicle during the trip (315). A variety of methods can be used to make this determination. One exemplary method is discussed further herein with respect to FIG. 6. However, it is contemplated that any of a variety of other methods may be used to determine whether the user of the device is driving. Alternatively, the user may explicitly report that s/he is driving. Sensor measurements may be taken only when the user is determined to be the driver in some embodiments, in order to prolong battery life of the mobile device and to avoid collection of unnecessary or unusable data.

The method further includes monitoring a plurality of behaviors associated with the mobile device during the trip in the vehicle using the sensor measurements (320). The plurality of behaviors may include any driving behaviors, such as braking behaviors, acceleration behaviors, mobile device usage behaviors (also referred to herein as "distracted driving behaviors"), and speeding behaviors. For example, data from an accelerometer indicating rapid deceleration (e.g., deceleration greater in magnitude than a threshold) may be correlated to a hard braking event indicative of braking behavior. In another example, data from an accelerometer indicating rapid acceleration (e.g., acceleration greater in magnitude than a threshold) may be correlated to a rapid acceleration event indicative of acceleration behavior. In still another example, data from an accelerometer indicating movement, interaction or manipulation of the mobile device by the user within the vehicle during a drive may be used to calculate a mobile device usage percentage (e.g., the percentage of the trip in the vehicle during which the user is interacting with the device) indicative of mobile device usage behavior. Determining mobile device usage during a drive is described further herein with respect to FIG. 7. In still another example, data from one or more sensors, in conjunction with available road data, may indicate that the user is driving above the speed limit, which may be correlated to speeding behavior.

The driving behaviors may also indicate positive driving behavior, such as a lack of hard braking events, a lack of speeding events, a lack of rapid acceleration events, and/or a lack of mobile device usage events. Some embodiments combine data from several sources, for example, driver identification, vehicle dynamics, and the driver's interaction with the mobile device, for instance, touching the screen of the device or moving the device, while going through a corner or speeding. Cross-correlation between the classification of drivers/driving behavior and the driver's actions while driving provide benefits not available with conventional techniques.

The method further includes computing a braking score using the braking behavior, computing an acceleration score using the acceleration behavior, computing a mobile device usage score using the mobile device usage behavior, and computing a speeding score using the speeding behavior (325). The various behavioral scores may be represented by any combination of letters, numbers, and/or symbols. For exemplary purposes, the scores are discussed with respect to a numerical score between 0 and 100 (e.g., "83") and/or a grade (e.g., "A" for scores between 90-100, "B" for scores between 80-89, "C" for scores between 70-79, "D" for scores between 60-69, and "F" for scores 59 and below).

In some embodiments, a braking score may be computed by comparing the number of hard braking events during the trip to an average number (or other statistical value) of hard braking events per trip. The average number of hard braking events per trip may be determined from driving data collected for other users during other trips in other vehicles. In alternative or additional embodiments, the average number of hard braking events per trip may be determined for the same user for other trips in the same or other vehicles. For example, if the user had one hard braking event during the trip and the average is one hard braking event per trip, a braking score of 75 may be assigned. In another example, if the user had no hard braking events during the trip and the average is one hard braking event per trip, a braking score of 100 may be assigned. In still another example, if the user had 3 hard braking events during the trip and the average is one hard braking event per trip, a braking score of 25 may be assigned. In one embodiment, the braking score may be curved to or centered on a particular score (e.g., 75 or 80) with respect to other braking scores for other trips of other users.

In some embodiments, an acceleration score may be computed by comparing the number of rapid acceleration events during the trip to an average number (or other statistical value) of rapid acceleration events per trip. The average number of rapid acceleration events per trip may be determined from driving data collected for other users during other trips in other vehicles. In alternative or additional embodiments, the average number of acceleration events per trip may be determined for the same user for other trips in the same or other vehicles. For example, if the user had one rapid acceleration event during the trip and the average is one rapid acceleration event per trip, an acceleration score of 75 may be assigned. In another example, if the user had no rapid acceleration events during the trip and the average is one rapid acceleration event per trip, an acceleration score of 100 may be assigned. In still another example, if the user had 5 rapid acceleration events during the trip and the average is one rapid acceleration event per trip, an acceleration score of 15 may be assigned. In one embodiment, the acceleration score may be curved to or centered on a particular score (e.g., 75 or 80) with respect to other acceleration scores for other trips of other users.

In some embodiments, a mobile device usage score may be computed by comparing the percentage of the trip that the user was interacting with the mobile device to an average percentage (or other statistical value) of trips in which users interacted with their mobile devices. The average percentage of trips in which users interacted with their mobile devices may be determined from driving data collected for other users during other trips in other vehicles. In alternative or additional embodiments, the average percentage may be determined for the same user for other trips in the same or other vehicles. For example, if the user interacted with the mobile device during 5% of the trip and the average is 2.5%, a mobile device usage score of 50 may be assigned. In another example, if the user interacted with the mobile device during 2.5% of the trip and the average is 2.5%, a mobile device usage score of 75 may be assigned. In one embodiment, the mobile device usage score may be curved to or centered on a particular score (e.g., 75 or 80) with respect to other mobile device usage scores for other trips of other users.

In some embodiments, a speeding score may be computed by comparing the percentage of the trip that the user was speeding to an average percentage (or other statistical value) of trips in which users were speeding. The average percentage of trips in which users were speeding may be determined from driving data collected for other users during other trips in other vehicles. In alternative or additional embodiments, the average percentage may be determined for the same user for other trips in the same or other vehicles. For example, if the user was speeding 15% of the trip and the average is 20%, a speeding score of 90 may be assigned. In this example, although the user sped less than the average, a score of 100 may not be assigned because the user still engaged in risky behavior. In another example, if the user was speeding 25% of the trip and the average is 20%, a speeding score of 71 may be assigned. In one embodiment, the speeding score may be curved to or centered on a particular score (e.g., 75 or 80) with respect to other speeding scores for other trips of other users.

The method further includes aggregating the braking score, the acceleration score, the mobile device usage score, and the speeding score to determine a trip score for the trip in the vehicle (330). In some embodiments, the braking score, the acceleration score, the mobile device usage score, and the speeding score may each be weighted equally (e.g., by multiplying each of the scores by 0.25) and combined to determine the trip score. In some embodiments, the braking score, the acceleration score, the mobile device usage score, and the speeding score may be weighted differently based on any criteria, such as the riskiness of the particular behavior. For example, it may be determined that the most risky to least risky behaviors are mobile device usage behaviors, speeding behaviors, braking behaviors, and acceleration behaviors. Thus, a weight of 0.4 may be assigned to the mobile device usage score, a weight of 0.25 may be assigned to the speeding score, a weight of 0.225 may be assigned to the braking score, and a weight of 0.125 may be assigned to the acceleration score. Thus, the trip score would be (0.4× mobile device usage score)+(0.25×speeding score)+(0.225× braking score)+(0.125×acceleration score).

Although described herein as determining and aggregating the braking score, acceleration score, the mobile device usage score, and the speeding score, it is contemplated that not all of these scores may be determined and/or aggregated in some embodiments. For example, in some embodiments, any combinations of one or more of these scores may be used, such as the braking score and the mobile device usage score, the acceleration score and the speeding score, just the mobile device usage score, etc.

In some embodiments, a first combination of scores may be determined and aggregated on a first trip to determine a first trip score. A second, different combination of scores may be determined and aggregated on one or more subsequent trips based on the first trip score. For example, a mobile device usage score may only be used on a first trip. If the mobile device usage score is low, indcating high mobile device usage, for example, all of the scores may be determined and aggregated on a subsequent trip to take into account other risky driving behaviors that may be associated with the mobile device usage.

In some embodiments, the method includes updating the measurement rate for the sensor measurements from the one or more sensors of the mobile device for a subsequent trip in the vehicle based on the trip score (335). For example, a trip score of 100 may indicate that the user is a very good driver. Thus, sensor measurements may be taken less frequently in the next trip that the user drives a vehicle because it is unlikely that risky driving behaviors will be detected. In another example, a trip score of 50 may indicate that the user is a very bad driver. Thus, sensor measurements may be taken more frequently in the next trip that the user drives a vehicle because it is likely that more risky driving behaviors will be detected.

In some embodiments, the types of sensor measurements made and/or the types of sensors used to monitor the driving behaviors may be altered for a subsequent trip in the vehicle based on the trip score. For example, all available sensors on the mobile device may be used on a first trip that receives a trip score of 98, indicating that the user is a very good driver. Thus, only one sensor or fewer sensors (e.g., sensors consuming little battery power) may be used in a subsequent trip in which the user drives a vehicle, because the user is unlikely to engage in risky driving behaviors. Sensors requiring large amounts of battery power, such as a GPS, may be deactivated. In another example, only an accelerometer on the mobile device may be used on a first trip that receives a trip score of 42, indicating that the user is a very bad driver. Thus, additional sensors may be employed in a subsequent trip in which the user drives a vehicle, because the user is likely to engage in risky driving behaviors that should be monitored. Similar methods may be used to determine whether specific types of sensor measurements should be made in subsequent trips (e.g., gravitational acceleration measurements).

Once the trip score is calculated, the method may restart at step 310 with obtaining sensor measurements from the mobile device in the vehicle for subsequent trips in which the user is driving. Additional trip scores may be obtained for subsequent trips. In some embodiments, the trip score for the first trip by the user may be combined with trip scores for subsequent trips by the user to determine an overall score for the user. In some embodiments, each of the trip scores may be weighted equally and combined to determine the overall score. In some embodiments, the trip scores may be weighted differently according to any criteria. For example, the trip scores for longer trips (i.e., trips of greater distance and/or greater duration) may be weighted heavier than the trip scores for shorter trips (i.e., trips of shorter distance and/or shorter duration).

In some embodiments, if a distance of any trip used to generate a trip score used in the overall score is greater than a threshold distance, the driving behaviors may be scaled down to the threshold distance. Scaling driving behaviors for longer trips down to a threshold distance according to this embodiment means that no single trip may have a major impact on the overall score. For example, if 4 hard braking events are observed on a 200 mile trip and the threshold distance is set at 100 miles, only 2 hard braking events may be used to determine the braking score. In this example, the 4 hard braking events are divided equally to obtain an average number of hard braking events per 100 miles. In another example, however, the number of braking events for a specific 100 mile section of the 200 mile trip may be determined and used for the braking score (e.g., the first 100 miles, the middle 100 miles, the last 100 miles, etc.). For example, if all 4 hard braking events are observed in the first 100 miles of the 200 mile trip and the threshold distance is set at the first 100 miles, all 4 hard braking events may be used to determine the braking score. Other driving behaviors (e.g., acceleration behaviors, mobile device usage behaviors, speeding behaviors, etc.) may be similarly scaled down to determine their individual scores.

In some embodiments, the overall score may be limited by a number of trips and/or an overall distance for all of the trips used in generating the overall score. For example, the overall score may only combine trip scores for the last 10 trips. In another example, the overall score may combine trip scores for the best 10 trips, worst 10 trips, average 10 trips, or some combination thereof. In another example, the overall score may only combine trip scores for the last 1,000 miles driven. These embodiments may ensure that the most relevant and/or most recent driving behaviors are being considered in the overall score, and that the overall score may be "rolling" in that any behavior modifications made by the user over time may be reflected in the overall score in a timely manner.

Figure 9:
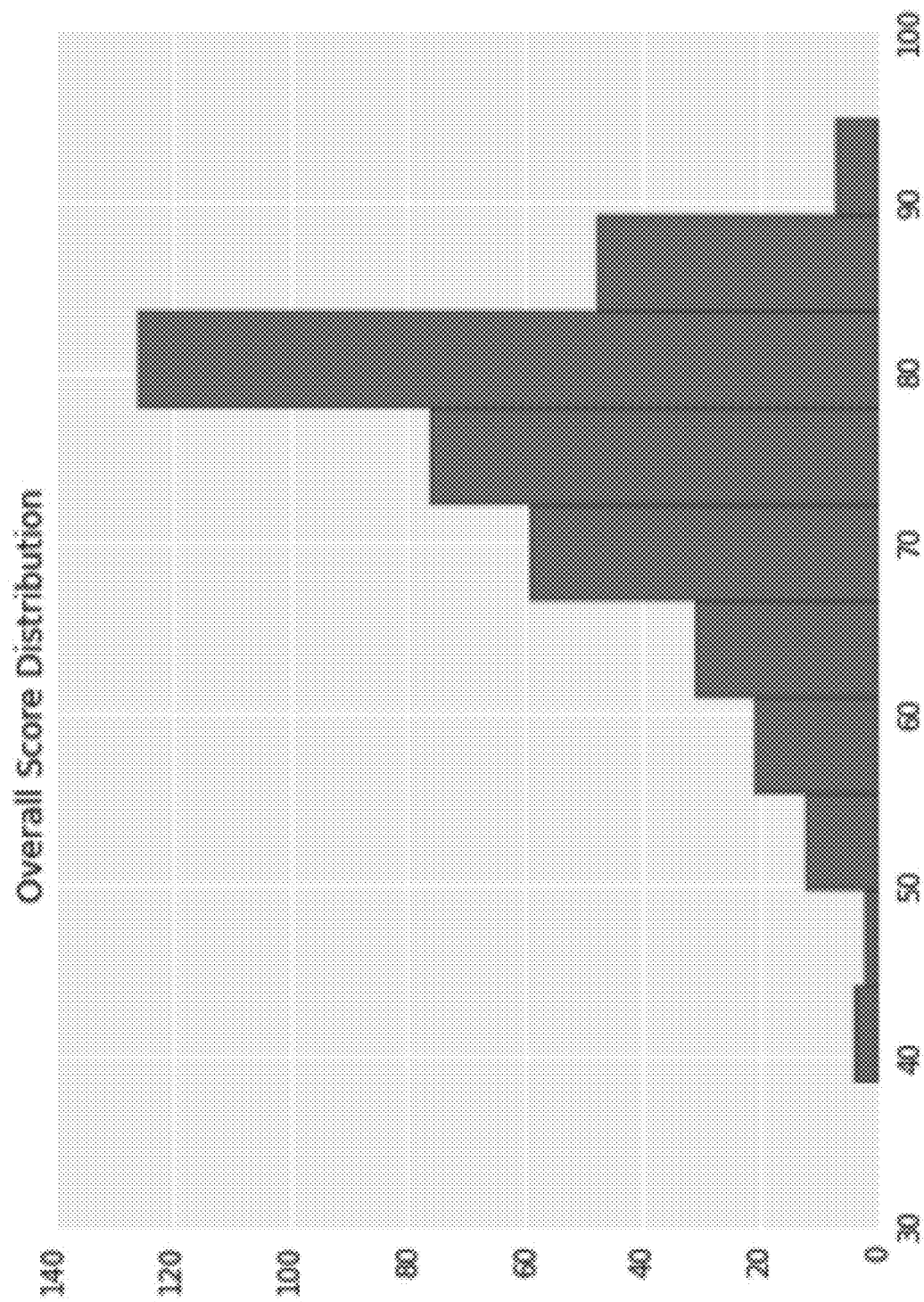
FIG. 9 illustrates a bar graph of the distribution of overall driving scores according to some embodiments.

In some embodiments, the overall score may be curved to or centered on a particular score (e.g., 75 or 80) with respect to other braking scores for other trips of other users. FIG. 9 illustrates a bar graph of the distribution of a random sampling of overall driving scores according to an embodiment. In FIG. 9, the x-axis represents the overall score and the y-axis represents the number of users with that overall score. As shown in FIG. 9, the overall scores have been curved to or centered on an overall score of 80, such that the most users (about 125) have an overall score of 80.

Figure 4:
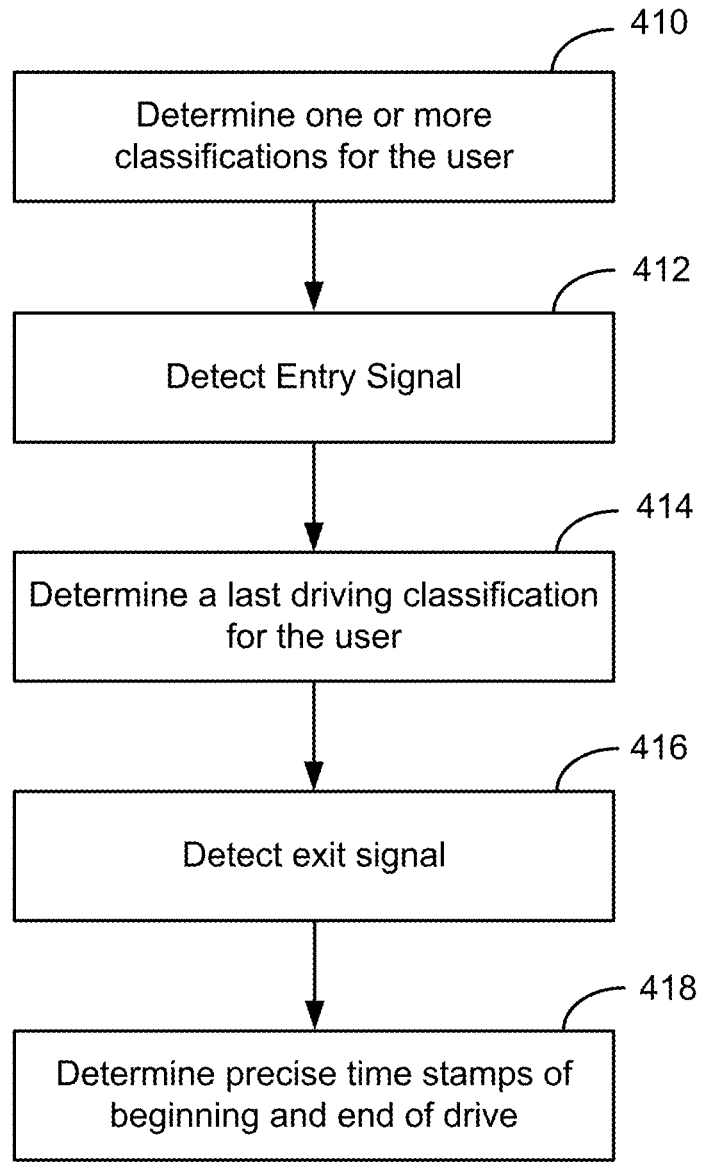
FIG. 4 is a flowchart illustrating a method of determining times during which a user is traveling according to some embodiments.

FIG. 4 is a flowchart illustrating a method of determining times during which a user is traveling according to an embodiment of the invention. The method includes determining one or more classifications for the user at step 410. These classifications include walking, driving, stationary, and other, and may be determined by using an accelerometer in the user's device and classifying the rate of movement of the user's device. The method further includes detecting an entry signal which corresponds to the last walking classification before the driving state is found at step 412. The method further includes determining a last driving classification for the user before a walking classification is found again at step 414. The method further include detecting an exit signal corresponding to the first walking classification after the driving event at step 416. The method further includes determining the precise time stamps of the beginning and end of a drive at step 418. Data during this window can be collected and analyzed in real-time, or after the drive. This method is described further in U.S. patent application Ser. No. 14/139,510, filed Dec. 23, 2013, entitled "METHODS AND SYSTEMS FOR DRIVER IDENTIFICATION", herein incorporated by reference in its entirety.

Figure 5:
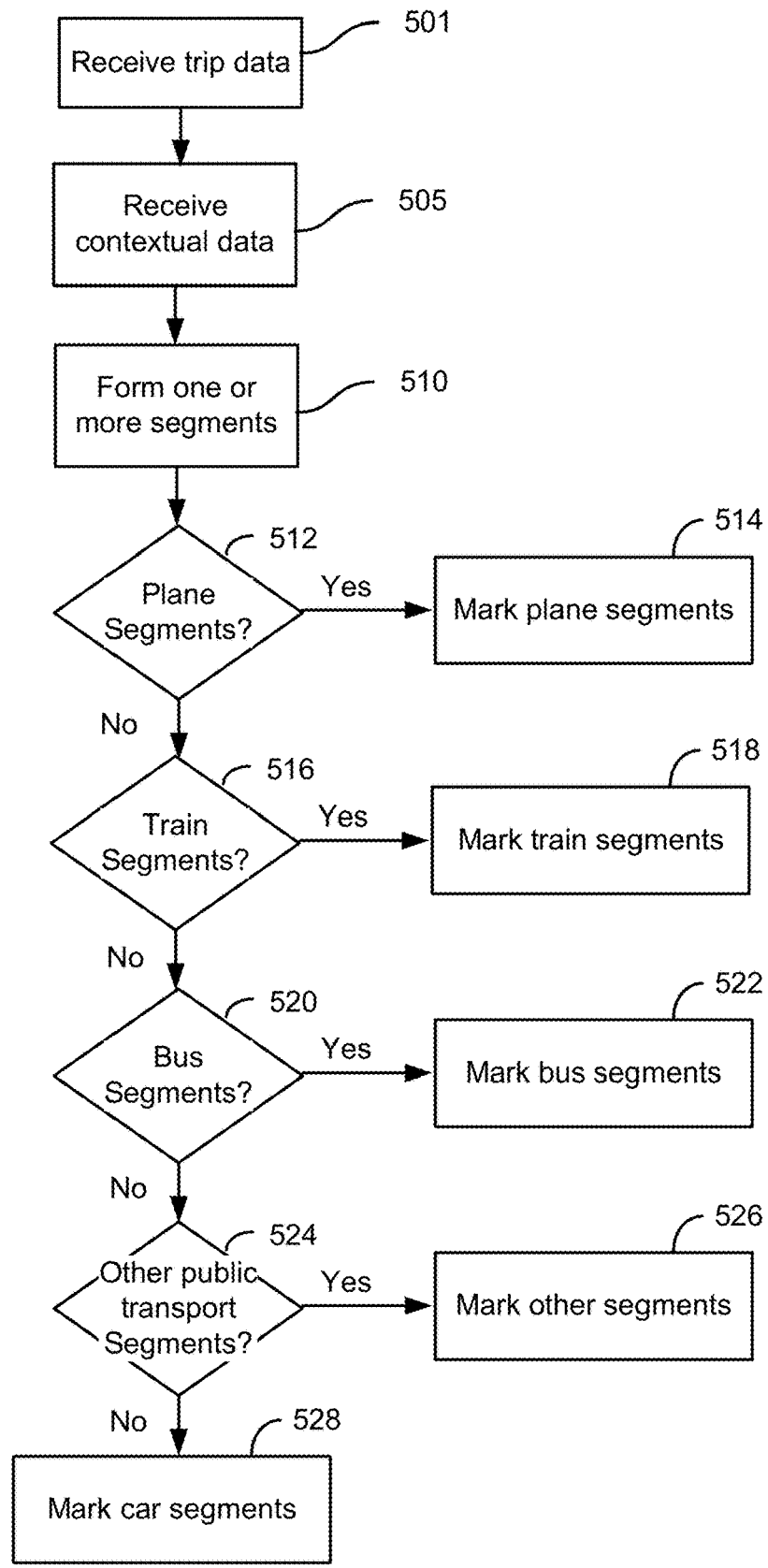
FIG. 5 is a flowchart illustrating a method of determining modes of transportation during a trip according to some embodiments.

FIG. 5 is a flowchart illustrating a method of determining modes of transportation during a trip according to an embodiment of the invention. This method may be used, for example, to determine that a user of a device is traveling by car, and not by another method. The method illustrated in FIG. 5 may utilize contextual data to remove non-driving modes of transportation from segments of the trip, resulting in the determination of driving segments during the trip. If the trip consists of solely non-driving modes, then the trip can be identified as such and not used to analyze the user's driving behaviors.

In the embodiments illustrated in FIG. 5, contextual data, also referred to as contextual map data, is utilized in determining the modes of transportation during a trip. The contextual map data can be stored in a database that includes data related to transportation systems, including roads, trains, buses, bodies of water, and the like. As an example, location data related to trains could include locations of train stations, locations of train tracks, timetables and schedules, and the like. Furthermore, location data related to a bus system could include bus routes, bus schedules, bus stops, and the like.

Referring to FIG. 5, the method includes receiving trip data at step 501 and receiving contextual data at step 505. Typically, the trip data is measured using a mobile device, such as a smart phone. The trip data can include location data (e.g., GPS data) as a function of time, accelerometer data, combinations thereof, or the like. In some embodiments, in order to prolong battery life, only location/GPS data is utilized, whereas in other embodiments, the location data is supplemented with accelerometer data. One of ordinary skill in the art would recognize many variations, modifications, and alternatives.

In some embodiments, the trip data may be analyzed to determine when stops are present in the trip data. As an example, using a mobile device, the velocity of the mobile device can be determined by analyzing the location data as a function of time. When the velocity of the mobile device drops below a threshold or is equal to zero for a predetermined period of time, a stop in the trip data can be determined. Thus, a trip can be broken down into segments based on the speed of the user. Wherever the measured speed is close to zero, the corresponding GPS point marks the beginning or end of a segment. Once the segments have been created, algorithms can be used as described below to determine the mode of transportation for the segment. In some embodiments, the segments are then grouped based on the determined mode to form stages.

Accordingly, the method further includes forming segments by defining the segments as time periods between stops in the trip data at step 510. Accordingly, for a given trip, a number of segments can be formed, with each segment separated by a stop in the trip data. As an example, if a person using the mobile device is riding on a bus, every time the bus stops can be defined as a segment. The contextual data can be used to determine that one or more of the segments are associated with a bus and the segments can be marked as bus segments. As contiguous segments are associated with a bus, a stage can be formed by linking together contiguous segments to form a stage of the trip associated with travel on a bus. Other modes of transportation can be defined based on segments and stages as well. In some embodiments, segments and stages can be associated with differing modes of transportation, such as walking before and after a bus stage.

The method also includes determining if segments of the trip are associated with planes at step 512 and removing these segments of the trip that are associated with airplanes. Segments are analyzed so that segments not associated with car travel (for example, starting with plane segments) are removed from the data set, leaving a data set only including car segments. Accordingly, driving data can be separated from other modes of transportation and driving behavior can be analyzed.

Returning to the classification performed at decision block 512, the contextual data received at step 505 includes locations of airports, airport runways, and the like. The location of the points in the trip are compared to the locations associated with airports, which can be represented by airport polygons. Although a taxiing plane can be characterized by speeds comparable to vehicle traffic, the location of the taxiing plane on a runway enables these points in the trip to be removed from the data set as a non-driving event. Thus, both location and vehicle speed as determined using the mobile device can be used to determine that a segment of a trip is associated with a plane. In some embodiments, the segment/stage of the trip associated with an airplane are marked accordingly.

The method further includes marking the segments of the trip that are associated with planes at step 514. If the trip data does not include any segments associated with a plane, then the method proceeds to determinations related to other modes of public transportation.

The method also includes determining if segments of the trip are associated with trains at step 516 and removing segments of the trip associated with trains. According to embodiments of the present invention, the category of trains can include various rail-based transportation systems, including commuter trains, light rail, subways, elevated-track trains, and the like. Accordingly, the use of the term "train" should be understood to include these rail-based transportation systems.

Data about the trip is used in conjunction with contextual data to determine segments of the trip that are associated with train travel and segments that are not associated with train travel. Although a train can move at speeds comparable to vehicle traffic, the location of the train tracks enables these points in the trip to be removed from the data set as a non-driving event. In the embodiment illustrated in FIG. 5, the method further includes marking the segments/stages of the trip associated with a train accordingly at step 518. If the trip data does not include any segments associated with a train, then the method proceeds to determinations related to other modes of public transportation.

The method further includes determining if segments of the trip are associated with a bus at decision block 520, and if so, removing these segments of the trip at step 522. Segments associated with a bus can be identified, for example, by using contextual data such as bus routes, and correlating the travel path or stopping pattern to the bus route. The method further includes determining if segments of the trip are associated with any other modes of public transportation such as, for example, a ferry at step 524. If so, the method further includes removing these segments at step 526. The method further includes marking the remaining segments as car segments at step 528. Although described with respect to a particular method, it is contemplated that other methods may be used to determine modes of transportation. This method and other methods are described in U.S. patent application Ser. No. 15/149,628, filed May 9, 2016, entitled "MOTION DETECTION SYSTEM FOR TRANSPORTATION MODE ANALYSIS", herein incorporated by reference in its entirety.

Figure 6:
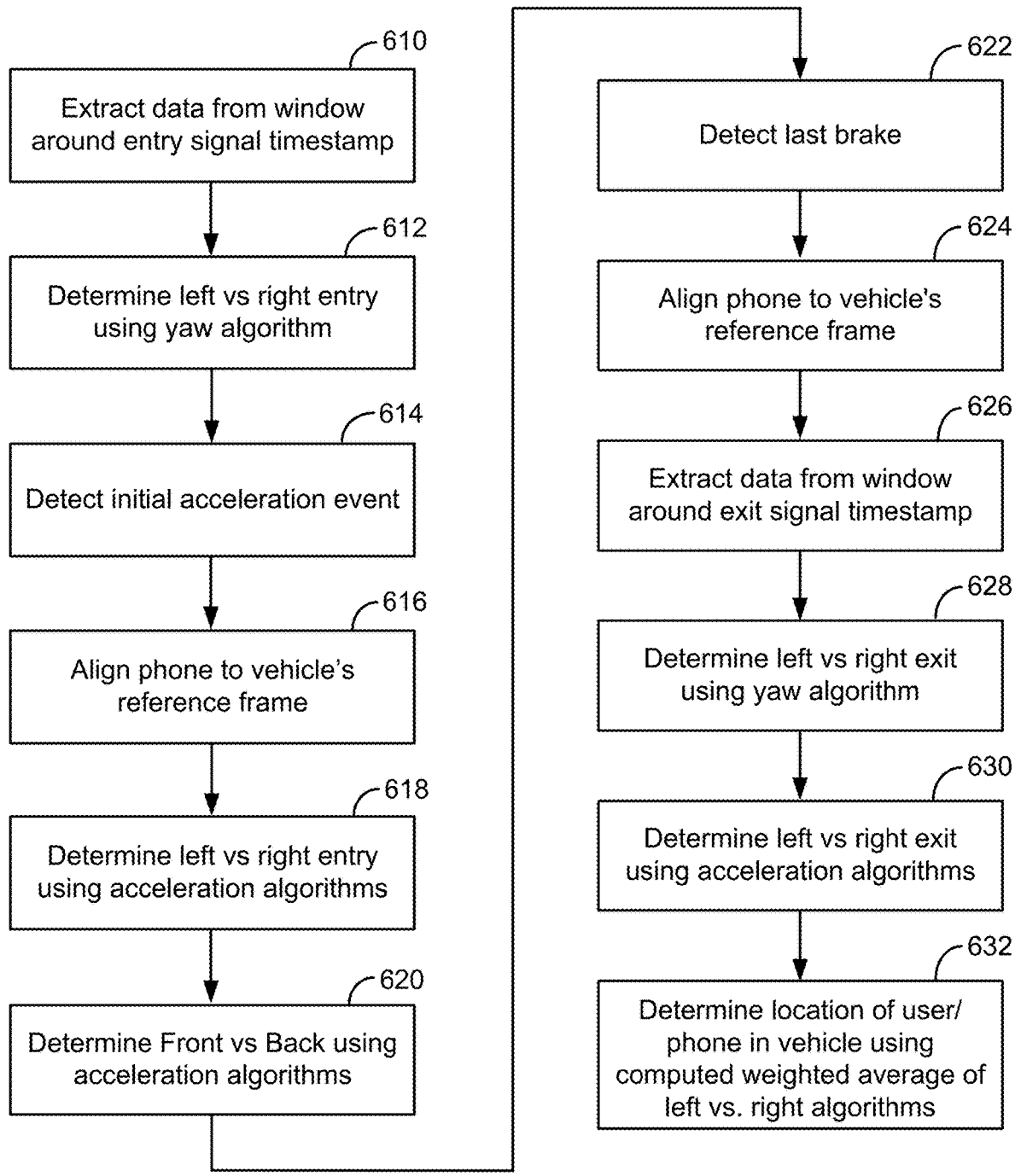
FIG. 6 is a flowchart illustrating a method of determining a location of a user of a mobile device in a vehicle according to some embodiments.

FIG. 6 is a flowchart illustrating a method of determining a location of a user of a mobile device in a according to an embodiment of the invention, in order to determine whether the user is driving the vehicle. The method illustrated in FIG. 6 provides a direct method of determining where a user and/or a user's mobile device is located in a vehicle and if the user is driving the vehicle during a driving event. The method includes extracting data from the window around the entry signal time stamp at step 610. It should be noted that the methods described in relation to FIG. 6 utilize information related to the entry of the user into the vehicle as described herein. When an individual enters and exits a vehicle, their body turns at least some minimum angle threshold (e.g., 40 degrees) about the z-axis (the z axis, is aligned with gravity, and the yaw is defined as the angular distance in a counter-clockwise direction around the z-axis). After merging the windows form the last walking and first driving classification, we can look in this merged window for the exact time when a user turns about the z axis at least some minimum threshold angle. This allows embodiments of the invention to narrow down the window to the exact point of entry.

In order to determine if the user entered the vehicle from the left or right, several algorithms can be used in conjunction with each other or separately. As an example, after identifying a precise time window of when the user has entered the vehicle, the user is identified as being on the left or the right side of the vehicle. This is determined using one, multiple, or all of the methods described below.

As illustrated in FIG. 6, the method further includes running a left vs. right enter yaw algorithm to determine if the driver entered from the left or the right side of the vehicle at step 612. As driving begins, the method further includes detecting an initial (e.g., the first) acceleration event at step 614. Although a first acceleration event is detected in some embodiments, other implementations will utilize an acceleration event early in the driving event, although not the first acceleration event.

Given the detection of the initial acceleration event, the method also includes aligning the phone to the vehicle's (e.g., a car's) reference frame at step 616. Given the alignment of the phone to the reference frame of the vehicle, the method further includes utilizing an acceleration-based algorithm to determine if the driver entered on the left or right side of the vehicle at step 618.

The method further includes determining if the user is in the front or back of the vehicle at step 620. One of multiple methods may be utilized to determine if the user is in the front or back of the vehicle.

Referring once again to FIG. 6, the method includes determining the user's exit from the vehicle. This includes detecting a terminal acceleration (i.e., a braking event) near or at the end of the driving event at step 622. In some implementations, the last braking event in the driving event is determined. As the driving event ends, a window can be created around the user's exit from the vehicle, with the window based on or including the end of the driving classification and the first walking classification after the driving event. The last braking event will be in this window.

After driving of the vehicle, the alignment between the phone and the vehicle's reference frame can change. Accordingly, the method further includes aligning the phone to the vehicle's reference frame after the last braking event is detected at step 624 and extracting data from the window around the exit signal timestamp at step 626.

In order to determine which side of the vehicle a user exited or was located during the driving event, the method further includes utilizing one or more left vs. right exit algorithms at step 630, including a yaw-based algorithm. In some embodiments, a weighted average of the left vs. right algorithms is computed. The method further includes determining the left vs. right and front vs. back location of the user/phone in the vehicle at step 632.

Further disclosure regarding driver identification methods that may be used in conjunction with some embodiments may be found in U.S. patent application Ser. No. 14/139,510, filed Dec. 23, 2013, entitled "METHODS AND SYSTEMS FOR DRIVER IDENTIFICATION"; and U.S. patent application Ser. No. 15/479,991, filed Apr. 5, 2017, entitled "SYSTEMS AND METHODS FOR INDIVIDUALIZED DRIVER PREDICTION", both of which are herein incorporated by reference in their entireties.

It should be appreciated that the specific steps illustrated in FIG. 6 provide a particular method of determining a location of a driver in a vehicle according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 7 is a flowchart illustrating a method of determining mobile device usage associated with a driver according to an embodiment of the invention. This determination can be accomplished by collecting and storing sensor data obtained from the mobile device at step 710, then analyzing the data at a server. In some embodiments this analysis can be performed using resources in the mobile device instead.

In different examples, this measured movement can be minor (e.g., a mobile device sliding sideways within a cup holder), or more substantial (e.g., the mobile device being picked up out of the cup holder and held to the ear of a driver). The method includes analyzing the movement measurements to determine whether they are indicative of a particular type of event occurring with respect to the mobile device in a vehicle at decision block 720. In some embodiments, this particular type of event is associated with use by the driver of mobile device, such that the driver of the vehicle is potentially not paying attention to driving tasks (e.g., the driver is distracted from driving tasks by the mobile device). For convenience, as used herein, inattentiveness, distraction, failing to pay attention, mobile device usage, and/or other similar terms and phrases broadly signify a driver not paying proper attention to tasks associated with safely operating the vehicle.

It is important to note that, for any analysis described herein, exclusions, thresholds and other limitations can be applied to allow for tuning of results. For example, certain types of applications (e.g., navigation applications, hands free phone calls) can be excluded in some embodiments from being assessed as distracting. In addition, a threshold can be applied to different analysis (e.g., a certain amount of movements must be detected to conclude a mobile device is being used).

As discussed below, not all movement measurements are associated with the driver of the vehicle, and not all uses of a mobile device by the driver lead to inattentiveness. It should be appreciated that different embodiments described herein provide the framework for measuring inattentiveness, but the thresholds and classifications used for this analysis is tunable. The definitions of distraction used by embodiments can be changed at any time, if needed. Some entities may want to flexibly define the potential for distraction of a given activity based on the demographics of the driver (e.g., hands-free use of a mobile device by a 21 year old person is distracting to some degree, while use by a 45 year old person is not). This incorporation of a wide variety of relevant factors in determining distraction is described further herein, and different factors can be applied at different phases in the analysis (e.g., picking up a mobile device can be determined to be indicative of driver inattentiveness at decision block 720, but later analysis determines that the mobile device is being used by a passenger and is not distracting to the driver).

Examples of which types of movement measurements may be found, by some embodiments, indicative of distraction by decision block 720, and how these movement measurements may be collected and analyzed, is discussed below.

The method further includes estimating the activity being performed with the mobile device by some embodiments at step 730. Examples of estimated activities include, but are not limited to: (1) the mobile device is estimated to be being held to the driver's (or a passenger's) ear, (2) the mobile device is estimated to be being held by the driver (or passenger) such that the screen can be viewed, (3) the mobile device is being held for viewing and the driver (or passenger) is interacting with the device (e.g., purposefully touching the touch screen and/or hardware keyboard of the mobile device), (4) the mobile device is being moved from one location in the vehicle (e.g., a pocket, the cup holder) to another location (e.g., a bracket mount closer to the driver's field of view). Discussion of the types of processes used by some embodiments to differentiate between the driver of a vehicle and passengers are discussed herein.

In some embodiments, the estimate of the activity being performed with the mobile device at step 730 is accomplished by the interpretation of movement measurements alone (e.g., an embodiment is not receiving status information from the mobile device as to what applications (texting, email, phone) are being executed on the device). As would be appreciated by one having skill in the relevant art(s), given the disclosure herein, the mobile devices vary in their ability to report this status information to some embodiments. For example, an application (e.g., some embodiments) executing on some iPhones, using some versions of Apple IOS, may not be able to receive the status of other executing applications, for any reason. With other mobile devices (e.g., those operating with Android OS), an application (e.g., some embodiments) can determine which other applications are executing.

The method further includes, in some embodiments, based on the time frame of the potentially distracting activity, identifying aggravating and/or mitigating factors at optional step 750. Though the attached figures illustrating embodiments should be interpreted such that, in some embodiments, all steps/components could be optional, combined with other steps/components and/or performed by different steps/components, step 750 has a dotted line to further emphasize the optional nature of this stage. This stage should not be interpreted to be more or less optional that other figure elements that do not have dotted lines.

Generally speaking, aggravating and mitigating factors are identified by cross-referencing one or more of pieces of external information that include, but are not limited to: the time period of the identified activity (e.g., from 8:12 PM to 8:22 PM), the location of the identified activity from GPS measurements (e.g., Maple Road), the demographics of the person identified to be the driver of the vehicle (e.g., 22 year old male), the reported weather conditions at the location (e.g., snowing), any special status of the location (e.g., a school zone), the speed of the vehicle (e.g., 15 miles per hour), time of day (e.g. at dusk), calendar date (e.g., Christmas Eve), and/or any other similar types of information relevant to how distracting an activity could be. Examples of potential mitigating factors include, but are not limited to: the slow speed of the vehicle at the time of the event, the experience of the driver, and the lack of traffic on the road. One having skill in the relevant art(s), given the description herein, will appreciate the broad variety of data sources that can be combined to provide additional aggravating and mitigating factor relevant to distracted driving.

Based on analysis of the kind described above, the method further includes estimating the level of driver inattentiveness (e.g., mobile device usage behaviors) during a particular time period at step 760. Once an estimate is completed by some embodiments, a mobile device usage score can be generated, as described further herein. One having skill in the relevant art(s), given the description herein, will appreciate that letter grades, for example, provide an easy to understand rating for different levels of distraction (e.g., an "F" assigned to a single event, and/or a drive that contained the event, where an incident was detected where a driver sent a text message while the vehicle was moving). As described herein, grades assigned to smaller behavior features (e.g., a single event), can be weighted and/or aggregated into an evaluation of larger behavior features (e.g., a whole drive, a month of driving, the driver's current behavior rating, and/or other similar features).

Further disclosure regarding systems and methods for detecting distracted driving or mobile device usage that may be used in conjunction with embodiments of the invention may be found in U.S. patent application Ser. No. 15/268,049, filed Sep. 16, 2016, entitled "METHODS AND SYSTEMS FOR DETECTING AND ASSESSING DISTRACTED DRIVERS", which is herein incorporated by reference in its entirety.

Figure 8A:
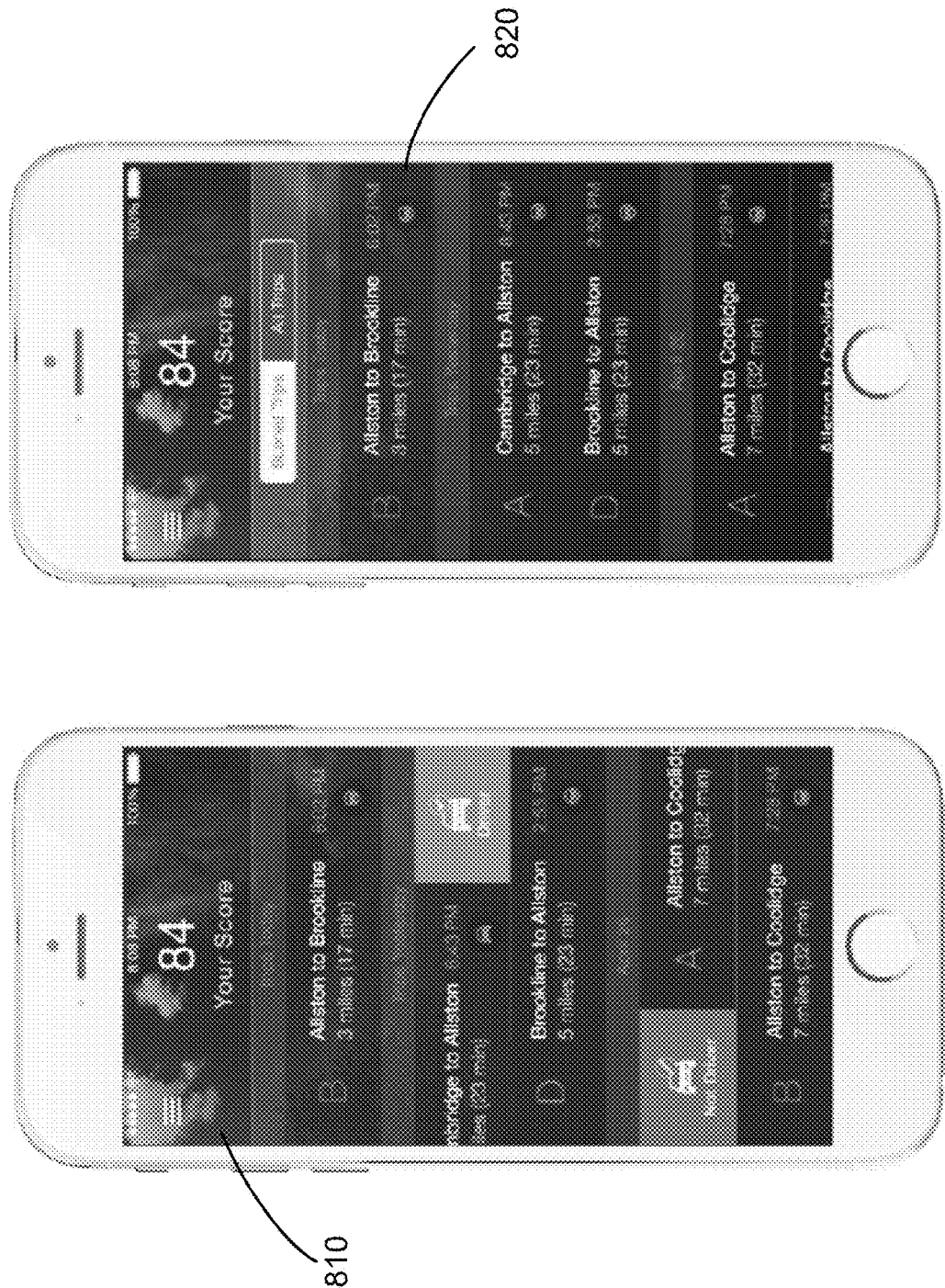
FIG. 8A illustrates screen shots of a user interface for scoring trips and determining user driver status according to some embodiments.

FIG. 8A illustrates screen shots of a user interface for scoring trips and determining user driver status according to an embodiment of the invention. In this example, scores associated with five trips are displayed. As an example, the first trip was at 6:02 PM from Allston to Brookline and was scored as a "B" score. As shown in FIG. 8A, the user can select or confirm on the summary screen 810 whether or not s/he was the driver during particular drives in one embodiment. For example, for the Cambridge to Allston trip, the user has confirmed that s/he was the driver. For this trip, the score does not appear, as it has been pushed off the screen for the user to confirm that s/he was the driver. In another example, for the Allston to Coolidge trip, the user has indicated that s/he was not the driver. Thus, this trip will be removed from the summary screen 810, and the trip's individual score will not be used to calculate the overall driver score of 84 in this example. In order to prevent users from removing low scoring trips for which they were the driver, some embodiments may not display particular trip scores, and instead only ask the user to confirm whether s/he was the driver. In other embodiments, some embodiments ask the driver to confirm driver or passenger status before a particular trip score is displayed.

Scored trips screen 820 summarizes all scored trips. Additional details related to each scored trip can be obtained by selecting a trip, which may result in the display of a trip-specific screen showing data about the trip, including the number of hard brakes (and/or the braking score), the number of rapid accelerations (and/or the acceleration score), percentage of the trip in which the user interacted with the mobile device (and/or the mobile device usage score), percentage of the trip in which the user was speeding (and/or the speeding score), and the like.

Figure 8B:
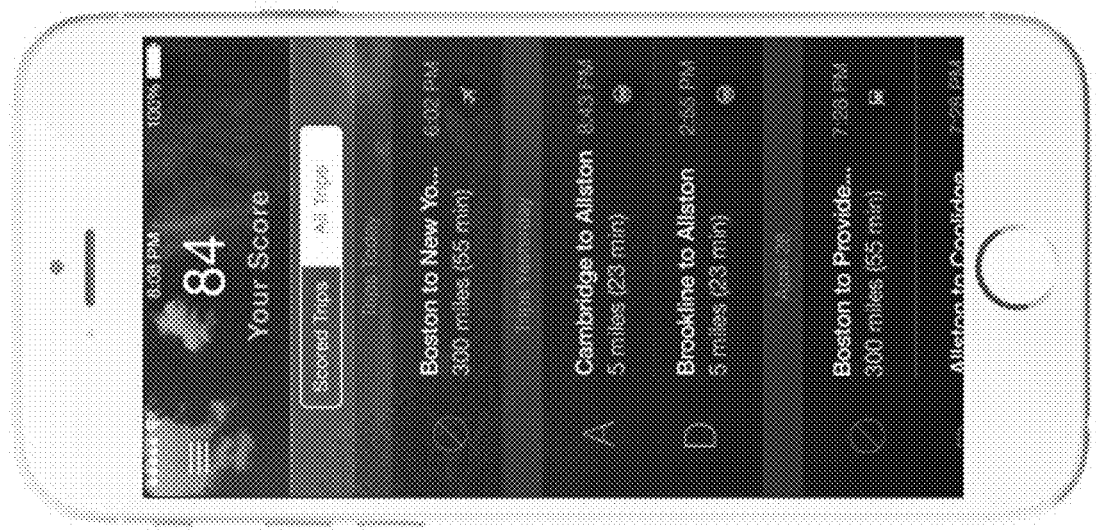
FIG. 8B illustrates a screen shot of a user interface for displaying scored and unscored trips according to some embodiments.

FIG. 8B illustrates a screen shot of all trips, both scored and unscored, depending on whether the trip was in a vehicle (and not another mode of transportation), and whether the user was the driver for a trip. For example, FIG. 8B illustrates a flight from Boston to New York, a drive from Cambridge to Allston, a drive from Brookline to Allston, and a train ride from Boston to Providence. The drives from Cambridge to Allston and from Brookline to Allston have been scored, while the flight and train ride have not been scored. The different modes of transportation taken by the user may be determined as discussed further herein with respect to FIG. 5.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method comprising:
obtaining sensor measurements at a measurement rate from one or more sensors of a mobile device in a vehicle during a trip;
identifying a user of the mobile device in the vehicle as a driver of the vehicle during the trip;
monitoring, by the mobile device, behaviors associated with the mobile device during the trip in the vehicle using the sensor measurements, the behaviors comprising braking behaviors, acceleration behaviors, mobile device usage behaviors, and speeding behaviors;
computing, by the mobile device, a braking score using the braking behaviors, an acceleration score using the acceleration behaviors, a mobile device usage score using the mobile device usage behaviors, and a speeding score using the speeding behaviors;
aggregating, by the mobile device, the braking score, the acceleration score, the mobile device usage score, and the speeding score to determine a trip score for the trip in the vehicle; and
updating the obtaining of the sensor measurements for a subsequent trip in the vehicle based on the trip score, wherein updating the obtaining of the sensor measurements comprises: adjusting the measurement rate for the sensor measurements for the subsequent trip, or selecting a different one or more sensors of the mobile device for the sensor measurements for the subsequent trip.

2. The method of claim 1, further comprising:
combining the trip score for the trip in the vehicle with other trip scores associated with other trips in which the user of the mobile device is the driver of the vehicle to determine an overall score for the user of the mobile device.

3. The method of claim 2, wherein if a trip distance associated with the trip in the vehicle is above a threshold distance, scaling the braking behaviors, the acceleration behaviors, the mobile device usage behaviors, and the speeding behaviors down to the threshold distance.

4. The method of claim 2, wherein an overall distance associated with the trip and the other trips is at or below a threshold overall distance.

5. The method of claim 1, wherein aggregating the braking score, the acceleration score, the mobile device usage score, and the speeding score comprises:
weighting the braking score, the acceleration score, the mobile device usage score, and the speeding score; and
combining the weighted braking score, the weighted acceleration score, the weighted mobile device usage score, and the weighted speeding score.

6. The method of claim 1, further comprising:
comparing the trip score for the trip in the vehicle with other trip scores associated with other trips in which other users of other mobile devices are driving other vehicles; and
curving the tri score and the other trip scores to be centered at a selected score.

7. The method of claim 1, wherein computing the braking score using the braking behaviors comprises:
comparing the braking behaviors during the trip in the vehicle to other braking behaviors during other trips by other users in other vehicles.

8. The method of claim 7, wherein comparing the braking behaviors to other braking behaviors comprises:
counting a number of hard braking events during the trip in the vehicle, wherein hard braking events are indicated by a deceleration measured by the one or more sensors of the mobile device being greater in magnitude than a threshold deceleration; and
comparing the number of hard braking events during the trip in the vehicle to other numbers of hard braking events during other trips by other users in other vehicles.

9. The method of claim 1, wherein computing the acceleration score using the acceleration behaviors comprises:
comparing the acceleration behaviors during the trip in the vehicle to other acceleration behaviors during other trips by other users in other vehicles.

10. The method of claim 9, wherein comparing the acceleration behaviors to other acceleration behaviors comprises:
counting a number of rapid acceleration events during the trip in the vehicle, wherein rapid acceleration events are indicated by an acceleration of the mobile device measured by the one or more sensors of the mobile device being greater in magnitude than a threshold acceleration; and
comparing the number of rapid acceleration events during the trip in the vehicle to other numbers of rapid acceleration events during other trips by other users in other vehicles.

11. The method of claim 1, wherein computing the mobile device usage score using the mobile device usage behaviors comprises:
comparing the mobile device usage behaviors during the trip in the vehicle to other mobile device usage behaviors during other trips by other users in other vehicles.

12. The method of claim 11, wherein comparing the mobile device usage behaviors to other mobile device usage comprises:
- determining a mobile device usage percentage indicated by a percentage of the trip in the vehicle during which the user is interacting with the mobile device; and
- comparing the mobile device usage percentage to other mobile device usage percentages for other trips by other users in other vehicles.

13. The method of claim 1, wherein computing the speeding score using the speeding behaviors comprises:
- comparing the speeding behaviors during the trip in the vehicle to other speeding behaviors during other trips by other users in other vehicles.

14. The method of claim 13, wherein comparing the speeding behaviors to other speeding behaviors comprises:
- determining a speeding percentage indicated by a percentage of the trip in the vehicle during which the vehicle is speeding; and
- comparing the speeding percentage to other speeding percentages for other trips by other users in other vehicles.

15. A mobile device comprising:
- a plurality of sensors;
- a memory; and
- a processor coupled to the memory, wherein the processor is configured to perform operations including:
  - obtaining sensor measurements at a measurement rate from one or more sensors of the plurality of sensors of the mobile device in a vehicle during a trip;
  - identifying a user of the mobile device in the vehicle as a driver of the vehicle during the trip;
  - monitoring, by the mobile device, behaviors associated with the mobile device during the trip in the vehicle using the sensor measurements, the behaviors comprising braking behaviors, acceleration behaviors, mobile device usage behaviors, and speeding behaviors;
  - computing, by the mobile device, a braking score using the braking behaviors, an acceleration score using the acceleration behaviors, a mobile device usage score using the mobile device usage behaviors, and a speeding score using the speeding behaviors;
  - aggregating, by the mobile device, the braking score, the acceleration score, the mobile device usage score, and the speeding score to determine a trip score for the trip in the vehicle; and
  - updating of the obtaining of the sensor measurements for a subsequent trip in the vehicle based on the trip score, wherein updating the obtaining of the sensor measurements comprises: adjusting the measurement rate for the sensor measurements for the subsequent trip, or selecting a different one or more sensors of the plurality of sensors of the mobile device for the sensor measurements for the subsequent trip.

16. The mobile device of claim 15, wherein the operations further include:
- combining the trip score for the trip in the vehicle with other trip scores associated with other trips in which the user of the mobile device is the driver of the vehicle to determine an overall score for the user of the mobile device.

17. The mobile device of claim 16, wherein if a trip distance associated with the trip in the vehicle is above a threshold distance, scaling the braking behaviors, the acceleration behaviors, the mobile device usage behaviors, and the speeding behaviors down to the threshold distance.

18. The mobile device of claim 16, wherein an overall distance associated with the trip and the other trips is at or below a threshold overall distance.

19. The mobile device of claim 15, wherein aggregating the braking score, the acceleration score, the mobile device usage score, and the speeding score comprises:
- weighting the braking score, the acceleration score, the mobile device usage score, and the speeding score; and
- combining the weighted braking score, the weighted acceleration score, the weighted mobile device usage score, and the weighted speeding score.

20. The mobile device of claim 15, wherein the operations further include:
- comparing the trip score for the trip in the vehicle with other trip scores associated with other trips in which other users of other mobile devices are driving other vehicles; and
- curving the trip score and the other trip scores to be centered at a selected score.

21. The method of claim 1, wherein adjusting the measurement rate comprises:
- increasing the measurement rate based on the trip score being below a first threshold; or
- decreasing the measurement rate based on the trip score being above a second threshold.

22. The method of claim 1, wherein the mobile device usage behaviors are monitored based on monitoring a relative movement of the mobile device with respect to the vehicle.

23. The method of claim 1, wherein each of the braking score, the acceleration score, the mobile device usage score, and the speeding score are scaled based on a distance of the trip; and
- wherein the trip score is computed based on aggregating the scaled braking score, the scaled acceleration score, the scaled mobile device usage score, and the scaled speeding score.

* * * * *